(12) United States Patent
Yang et al.

(10) Patent No.: US 8,792,571 B2
(45) Date of Patent: Jul. 29, 2014

(54) CHANNEL STATUS INFORMATION FEEDBACK

(75) Inventors: Hongwei Yang, PuDong Jinqiao Shanghai (CN); Di Lv, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/639,227

(22) PCT Filed: Apr. 7, 2010

(86) PCT No.: PCT/CN2010/071597
§ 371 (c)(1),
(2), (4) Date: Oct. 4, 2012

(87) PCT Pub. No.: WO2011/124025
PCT Pub. Date: Oct. 13, 2011

(65) Prior Publication Data
US 2013/0028340 A1 Jan. 31, 2013

(51) Int. Cl.
*H04L 27/28* (2006.01)
(52) U.S. Cl.
USPC ........... 375/260; 375/295; 375/316; 375/259; 375/285; 375/296; 375/299; 375/346; 375/219; 375/220; 375/221
(58) Field of Classification Search
USPC ......... 375/295, 316, 259, 260, 285, 296, 299, 375/346, 219, 220, 221
See application file for complete search history.

(56) References Cited

U.S. PATENT DOCUMENTS 8,391,392 B2 * 3/2013 Melzer et al. ................. 375/267
(Continued)

FOREIGN PATENT DOCUMENTS

| CN | 101394256 A | 3/2009 |
|---|---|---|
| CN | 101534268 A | 9/2009 |
| CN | 101686079 A | 3/2010 |
| CN | 101689903 A | 3/2010 |

OTHER PUBLICATIONS

International Search Report for PCT/CN2010/071597 dated Jan. 13, 2011.

*Primary Examiner* — Siu Lee
(74) *Attorney, Agent, or Firm* — Fay Sharpe LLP (57) ABSTRACT

The present invention provides a method and system for channel status information feedback based on a hierarchical codebook, the method comprising steps of: generating a hierarchical codebook; configuring the generated hierarchical codebook to a transmit end and a receive end, respectively; and feeding back channel state information from the receive end to the transmit end based on the hierarchical codebook, wherein the step of generating a hierarchical codebook further comprises the following steps: i) dividing each level of codeword in a to-be-generated codebook into a plurality of segments based on a basic codebook; ii) a module configured to generate each level of codeword in a first stage, wherein the each level of codeword is selected from the basic codebook; and iii) generating each level of codeword in other stages, wherein the each level of codeword is selected a pre-provided training sample matrix. And the feeding back the channel status information from the receiving end to the transmitting end based on the hierarchical codebook further comprises using a first bit and a second bit of the feedback bits to represent a signaling for performing tree search to the hierarchical codebook.

20 Claims, 5 Drawing Sheets

(56) References Cited

U.S. PATENT DOCUMENTS

| | | |
|---|---|---|
| 2008/0249783 A1 | 10/2008 | Stachurki |
| 2010/0074353 A1 | 3/2010 | Zhou et al. |
| 2010/0182172 A1 | 7/2010 | Tosato et al. |
| 2010/0202549 A1* | 8/2010 | Lin et al. ................. 375/260 |
| 2010/0322331 A1* | 12/2010 | Sun et al. ................. 375/260 |
| 2011/0268100 A1* | 11/2011 | Gorokhov et al. ......... 370/342 |
| 2012/0188900 A1* | 7/2012 | Li et al. .................... 370/252 |

* cited by examiner

CHANNEL STATUS INFORMATION FEEDBACK

TECHNICAL FIELD

The present invention relates to an improvement of channel feedback in MIMO (Multi-Input Multi-Output) technology, and more specifically, to a codebook generation method for channel feedback in the MIMO technology and improvement of an associated Precoding Matrix Indicator (PMI) feedback signaling mechanism.

TECHNICAL BACKGROUND

MIMO, as a well known important technology in the current wireless system, creates multiple spacial channels through setting multiple transmit and receive antennas at the transmit end and the receive end, such that the capacity of uplink and downlink capacities can be improved and transmission of wireless signals can be further improved. For the MIMO technology, it is required to obtain channel state information at the transmit end so as to realize spatial multiplexing. In the case of FDD (frequency-division multiplexing), a base station (eNB) must rely on a feedback from a user equipment (UE) side to obtain such kind of channel state information. It has been already aware that the accuracy of quantization and feedback of the channel from the user terminal side should be improved to enhance the LTE-A downlink MIMO technology.

The hierarchical feedback as described in the literature "A Closed-Loop Multiple-Input-Multiple-Output Scheme For Wireless Communication Based On Hierarchical Feedback" submitted by F. Boccardi, H. Huang, and A. Alexiou on May 29, 2007 is a promising candidate scheme. The basic idea of the hierarchical feedback scheme is that if the channel changes sufficiently slowly, then the mobile channel direction indication (CDI) feedback could be aggregated over multiple feedback intervals, so as to index a larger codebook using aggregated bits. Generally, a larger codebook means more accurately describing the MIMO channel state, which is undoubtedly helpful to perform more optimized precoding at a base station side to thereby enhance system performance such as resource utilization and data throughput.

Based on such hierarchical feedback scheme, first, it is required to generate a hierarchical codebook that may accurately depict the channels experienced by the user terminal; second, it is required to use a PMI feedback signaling based on the hierarchical codebook to perform channel state information (such as CDI) transmission.

A hierarchical codebook generation method has been proposed in the paper "On transceiver design and channel quantization for downlink multiuser MIMO systems with limited feedback" (IEEE Journal on selected Areas in communications, Vol. 26, no. 8, October 2008") by M. Trivellato, F. Boccardi and H. Huang, and all content of which is incorporated here by reference. The binary process generated by the hierarchical codebook may be represented by a binary tree of levels, the codewords on the ith level of the codebook having 2 elements. In the generation procedure, the codewords are arranged into the structure of the hierarchical codeword tree. It would be appreciated that for the above hierarchical feedback, through aggregating feedback bits over multiple intervals, the codewords indexed by feedback over a given interval are usually associated nodes of the codewords indexed by the feedback over the preceding time interval.

Figure 1:
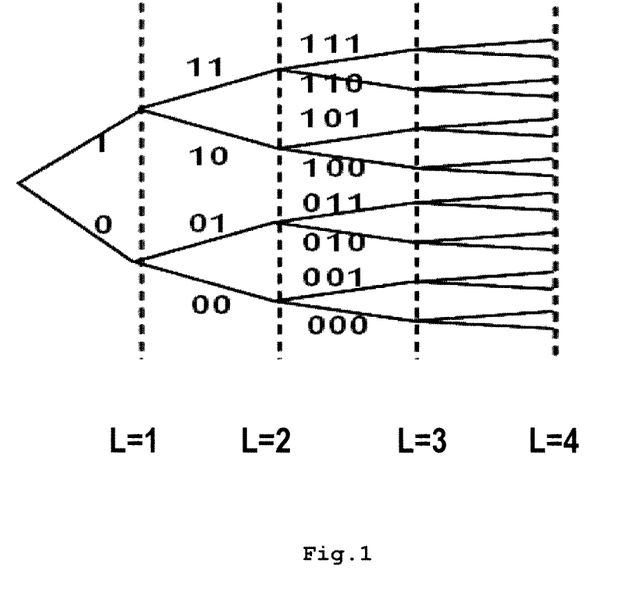
FIG. 1 illustrates a binary tree structure representation of a hierarchical codebook generating method in the prior art.

Based on this reference literature, given the transmit antenna number M and the maximum bit numbers of the hierarchical codebook tree $B_{max}$, the codewords in the codebook may be designed into the hierarchical tree structure of FIG. 1 through the following steps:

1) At the level $L=\log_2(M)$, the total number of codewords M in this level is $2^L$, including M orthogonal unit norm vectors derived from DFT (Discrete Fourier Transformation) codebook, where M is the transmit antenna number;
2) Compute a partition region relative to each codeword and obtain L subsets of training samples;
3) For level L+1, L+2, . . . $B_{max}$, compute an optimum codebook with 2 vectors for each subset using e.g. LBG algorithm and split each subset into 2 subsets.

FIG. 1 shows a hierarchical tree (binary tree) structure representing codeword arrangement of a hierarchical codebook. Each dotted line in the figure represents one level, and a dot at the intersection of a solid line and a dotted line represents a codeword on that level. It may be seen that the first level has two codewords, the second level has four codewords, the third level has eight codewords, and the Lth level has $2^L$ codewords, and so forth. From the binary tree in the figure, hierarchical partition of the hierarchical codebook space can be seen intuitively.

However, the brand-new hierarchical codebook as generated above is hardly accepted by a standard such as LTE 10. On one hand, such a hierarchical codebook doesn't inherit good codebook properties like constant modular, unitary, nested structure, finite alphabet, etc., which are highly desired from the perspective of many companies (see 3GPP Tdoc R1-101674, "Views on Codebook Design for Downlink 8Tx MIMO", NTT Docomo). On the other hand, LTE R10 will be finished at the end of 2010, and the remained timeline is too tight to have sufficient efforts to define such a new codebook (about 2 years were taken to define the LTE R8 codebook).

In this case, it is desirable to propose a new channel state information feedback solution, comprising an improved hierarchical codebook generating method, such that the generated codebook inherits not only the existing good codebook properties but also the merits of hierarchical codebook to improve channel feedback accuracy; correspondingly, it further comprises an improved feedback signaling mechanism to provide subsequent application of the codebook to obtain a hierarchical feedback solution supported by the LTE R10.

SUMMARY OF THE INVENTION

According to the first aspect of the present invention, there is provided a method for performing channel state information feedback using a hierarchical codebook. The method comprises steps of:

generating a hierarchical codebook;

configuring the generated hierarchical codebook to a transmit end and a receive end, respectively; and feeding back channel state information from the receive end to the transmit end based on the hierarchical codebook.

Preferably, the step of generating a hierarchical codebook in the method further comprises the following steps:

i) splitting codewords at each level in a to-be-generated codebook into multiple stages based on a basic codebook;

ii) generating codewords at each level in a first stage, wherein the codewords at each level are selected from the basic codebook; and iii) generating codewords at each level in other stages, wherein the codewords at each level are selected from a pre-provided training sample matrix.

Preferably, the step of feeding back channel state information from the receive end to the transmit end based on the hierarchical codebook further comprises the following steps:

Using a first bit and a second bit of the feedback bits to represent a signaling for performing tree searching to the hierarchical codebook.

According to the second aspect of the present invention, there is provided a system for performing channel state information feedback using a hierarchical codebook. The system comprises:

a module configured to generate a hierarchical codebook;

a module configured to configure the generated hierarchical codebook to a transmit end and a receive end, respectively; and a module configured to feed back channel state information from the receive end to the transmit end based on the hierarchical codebook.

Preferably, the module configured to generate a hierarchical codebook in the system further comprises:

i) a module configured to split codewords at each level in a to-be-generated codebook into multiple stages based on a basic codebook;

ii) a module configured to generate codewords at each level in a first stage, wherein the codewords at each level are selected from the basic codebook; and iii) a module configured to generate codewords at each level in other stages, wherein the codewords at each level are selected from a pre-provided training sample matrix.

Preferably, the module configured to feed back channel state information from the receive end to the transmit end based on the hierarchical codebook further comprises:

a module configured to use a first and a second bits of the feedback bits to represent a signaling for performing tree searching to the hierarchical codebook.

According to the third aspect of the present invention, there is provided a computer program product. The computer program product comprises a computer-usable medium storing a computer program instruction, wherein the computer program instruction, when running on a computing apparatus, enables the computing apparatus to implement the above method.

According to the fourth aspect of the present invention, there is provided a communication system. The communication system comprises the system for channel state information feedback using a hierarchical codebook.

By using the channel state information feedback method of the present invention, not only the advantage of improved feedback accuracy of a hierarchical codebook is utilized, but also the hierarchical codebook is enabled to be compatible with the existing LTE R8 to thereby inherit the good codebook properties; besides, through an improved feedback signaling, an effect of indexing a larger codebook with limited feedback bits is realized.

BRIEF DESCRIPTION OF THE DRAWINGS

The features and advantages of the present invention can be easily understood through the following detailed description with reference to the accompanying drawings, wherein.

DETAILED DESCRIPTION OF THE PREFERRED EMBODIMENTS

These drawings and subsequent description relate to preferred embodiments of the present invention which are only exemplary. It should be noted that from the subsequent illustration, it would be easy to regard the alternative embodiments of the structures and methods disclosed here as feasible alternative manners, and these alternative manners can be used without departing from the principle of the invention as claimed.

Now, several embodiments of the present invention will be referenced in detail, the examples of which are illustrated in the drawings. It should be noted that, similar or same reference numerals, if feasible, may be used in the drawings and these drawings merely describe the embodiments of the present invention for exemplary purposes. Those skilled in the art would appreciate from the subsequent depiction that the alternative embodiments of the structures and methods as described here may be likewise used without departing from the invention principle as described here.

The method for channel state information feedback as provided in the present invention improves from the two aspects of codebook generation and signaling feedback.

In the staged hierarchical codebook generation method of the present invention, codebook generation constraints are predefined to individual stages, respectively. Specifically, the first stage of codewords in the hierarchical codeword tree are generated to satisfy some generation constraints, for example, good codebook properties of constant modulo, unitary, nested structure, finite alphabet, etc.; and other stages of codewords in the hierarchical codeword tree are generated to give other generation constraints, for example, optimal performance gain. It should be understood that, correspondingly, the PMI feedback approach as used during multiple feedback intervals should be designed deliberately to take full usage of different codebook properties in individual stages.

Generation of Staged Hierarchical Codebook

Now, one preferred embodiment of generation of a staged hierarchical codebook of the present invention will be described for an LTE R10 4Tx codebook generation (i.e., 4 transmit antennas) with Rank 1. This embodiment clearly shows that the staged hierarchical codebook not only has good codebook properties and feedback accuracy, but also has good backward compatibility to LTE R8 codebook.

In this example, given the number of transmit antennas M=4 and the maximum bit number of the hierarchical codebook tree $B_{max}=12$, the hierarchical codebook is generated in stages through the following steps.

(1) predefining staged codebook generation constraints

In this example, a two-stage generation constraints are predefined. The targets for the first stage are good codebook properties and backward compatibility, and the target for the second stage is performance gain optimization. It should be understood that according to the specific requirements on properties, a to-be-generated codebook may also be divided into more stages, so as to predefine different codebook generation constraints for different stages.

Figure 2:
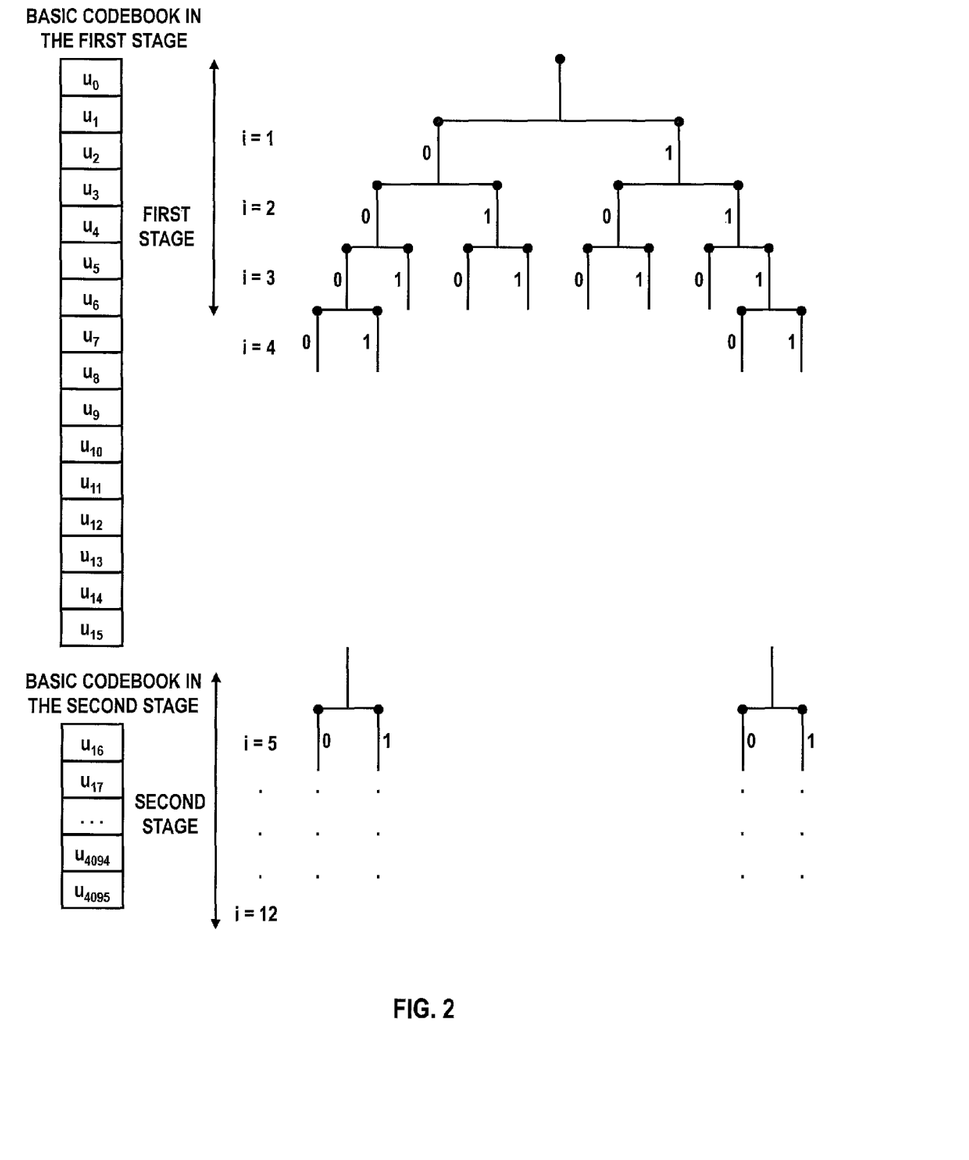
FIG. 2 illustrates a binary system constructing process represented by a binary three for generating a codebook according to a staged hierarchical codebook generating method of the present invention.

As shown in FIG. 2, in this example, the codebook generation is divided into two stages, wherein the 1-4 levels are the first stage, and the 5-12 levels are the second stage.

(2) The first stage includes generating 4 levels of codewords corresponding to the LTE R8 codebook. It should be understood that more levels can be extended to. The jth codeword in the ith level is denoted by $v^i_j$, wherein $i=1, \ldots, 12$, $j=1, \ldots, 2^i$. In order to capture good codebook properties and backward compatibility to the LTE R8 codebook, codebook generation in this stage will be based on the LTE R8 codebook (referring to 3GPP TS36.211), for example, the codebook $\{u_k, k=1, \ldots, 16\}$ in Table 1. Of course, It should be understood that different codebook properties can be captured based on other codebooks

TABLE 1

LTE R8 codebook generation for 4Tx (i.e., 4 transmit antennas) and Rank 1

| Codebook Index | $u_n$ |
|---|---|
| 0 | $u_0 = [1\ -1\ -1\ -1]^T$ |
| 1 | $u_1 = [1\ -j\ 1\ j]^T$ |
| 2 | $u_2 = [1\ 1\ -1\ 1]^T$ |
| 3 | $u_3 = [1\ j\ 1\ -j]^T$ |
| 4 | $u_4 = [1\ (-1-j)/\sqrt{2}\ -j\ (1-j)/\sqrt{2}]^T$ |
| 5 | $u_5 = [1\ (1-j)/\sqrt{2}\ j\ (-1-j)/\sqrt{2}]^T$ |
| 6 | $u_6 = [1\ (1+j)/\sqrt{2}\ -j\ (-1+j)/\sqrt{2}]^T$ |
| 7 | $u_7 = [1\ (-1+j)/\sqrt{2}j\ (1+j)/\sqrt{2}]^T$ |
| 8 | $u_8 = [1\ -1\ 1\ 1]^T$ |
| 9 | $u_9 = [1\ -j\ -1\ -j]^T$ |
| 10 | $u_{10} = [1\ 1\ 1\ -1]^T$ |
| 11 | $u_{11} = [1\ j\ -1\ j]^T$ |
| 12 | $u_{12} = [1\ -1\ -1\ 1]^T$ |
| 13 | $u_{13} = [1\ -1\ 1\ -1]^T$ |
| 14 | $u_{14} = [1\ 1\ -1\ -1]^T$ |
| 15 | $u_{15} = [1\ 1\ 1\ 1]^T$ | a) At the level $i=1$, a codeword pair $\{v_1^1, v_2^1\}$ is selected from the base codebook $\{u_k\}$ in Table 1 as the two codewords in the 1st level based on a certain performance metric (e.g. capacity maximization, minimum mean square error (MMSE), minimum distance, maximum signal to noise ratio, maximum signal to interference plus noise ratio, and maximums signal to interference ratio, etc.). Of course, LBG algorithm can be used to perform such selection. The LBG algorithm is an algorithm to approximate to an optimal codebook through a training vector set and a certain iteration algorithm. It should be noted that a certain number of channel matrix training samples should be given in advance if LBG algorithm is used.

b) Partition regions of training samples are calculated relative to each of the selected codewords in step a), with 2 subsets of training samples being obtained.

c) For other levels $i=2, 3,$ or 4 in the stage 1, the LBG algorithm is used to continue selecting an optimum codeword pair $\{v^i_j, v^i_{j+1}, i=2, \ldots, 4, j=1, 3, \ldots, 2^i-1\}$ from the base codebook $\{u_k\}$ with 2 vectors for each subset, so as to further split each subset into 2 subsets.

During generation in this stage, because the codewords are all selected from the LTE R8 codebook, with respect to the previously mentioned hierarchical codebook in the paper "On transceiver generation and channel quantization for downlink multiuser MIMO systems with limited feedback" (IEEE Journal on selected Areas in communications, Vol. 26, no. 8, October 2008) by M. Trivellato, F. Boccardi, and H. Huang, the obtained codebook might not be optimum. The reason is that the codewords are not randomly selected merely based on the performance targets in pursuit, and the selection scope is limited to a codebook for a base codebook (i.e., LTE R8). However, the result of such practice is that the obtained codebook is compatible to the LTE R8 codebook, thereby having good codebook properties such as constant modular, unitary, nested structure, finite alphabet, etc.

(3) The second stage includes the remaining levels, e.g. $i=5, \ldots, 12$. In this stage, the target is not to apply codebook generation constrains for good codebook properties like constant modula, finite alphabet, but to optimize performance gain of the system to the utmost. Therefore, this stage will not be based on a base codebook such as LTE R8 codebook, but selects optimum codewords in a greater codebook space.

d) At the level $i=5$, the partition regions are computed relative to each codeword in this level, with $2^4$ subsets of training samples being obtained.

e) For level $i=6, \ldots, 12$, the optimum codebook is computed using the LEG algorithm based on performance metrics (for example, capacity maximization, minimum mean square error (MMSE), minimum distance, maximum signal to noise ratio, maximum signal to interference plus noise ratio, and maximum signal to interference ratio, etc.) identical to or different from the performance metrics in the first stage; each subset has two vectors and is further split into two subsets.

According to generation of the second stage, other levels of the codebook are generated based at least in part on a hierarchical codebook generation method in the above prior art, thereby the obtained codebook has an advantage of enhancing feedback accuracy as a hierarchical codebook. Now, the staged hierarchical codebook generation method according to the present invention achieves an optimal tradeoff between the advantage of a hierarchical codebook and the compatibility of an LTE R8 codebook. Such a generation solution is undoubtedly more practical and more preferable currently.

As above mentioned, a codebook generation having a tree structure may be applied to a time-related MIMO channel to dramatically reduce feedback overheads. In other words, by generating a codebook using a hierarchical tree structure, a system having a low-speed moving terminal may improve system throughput with a given number of feedback bits. When performing precoding, the transmitting end obtains channel state feedback through limited (limited bandwidth) feedback bits of a set of precoding vectors contained in an index predefined codebook from the receiving end.

PMI Feedback

The present invention further provides a flexible feedback signaling generation to take full usage of redundant signaling bit for PMI data transmission. Such modification not only improves performances of hierarchical feedback due to improved allocation of signaling bit number and signaling format, but also takes full usage of different codebook properties in the staged hierarchical codebook structure as introduced in section 1.

Assuming at the feedback interval n−1, both the base station and the user equipment share a quantized reconstructed vector $\hat{v}(n-1)$, represented by a binary word of variable length $L_s(n-1)$. At interval n, the user equipment uses a linear or tree search to choose the best codeword $\hat{v}(n)$ of $B_{max}$ bits for the current channel matrix and compares $\hat{v}(n)$ and the first $L_s(n-1)$ bits of the binary representations of $\hat{v}(n-1)$. The comparison leads to three cases, corresponding to a match (Down case), partially match (Up case I) and not match (Up case II) between the two sequences.

The format of feedback bit is defined as follows: let i(n) be the binary word of B bits fed back by UE at time interval n. The first or second bit ($i_1(n)$ or $i_2(n)$) are used for signaling, and the signaling format is defined in table 2. As illustrated in the table, only if $i_1(n)=1$, $i_2(n)$ means a signaling; otherwise $i_2(n)$ is a data to index a codeword.

TABLE 2

Signaling Format

| $i_1(n)$ | $i_2(n)$ | Signaling |
|---|---|---|
| 0 | 0 or 1 is for PMI index | Down case |
| 1 | 0 | Up case I |
| 1 | 1 | Up case II |

Corresponding to the above three cases, the following bits are determined through the following steps:

1. Down case: This case occurs when the $L_s(n-1)$ MIB bits associated to $\hat{v}(n)$ equals to $L_s(n-1)$ bits associated to $\hat{v}(n-1)$ In this case, the channel state information is refined through feeding back further B−1 bits of the $B_{max}$-bits codeword. These additional bits are obtained by going down by B−1 levels into the quantization tree. This is performed by feeding back bits at positions $L_s(n-1)+1, \ldots, L_s(n-1)-B+1$ of the codeword associated to $\hat{v}(n)$. Moreover, $L_s(n)=L_s(n-1)+B-1$.

2. Up case I: This case occurs when $L_s(n-1)-(B-2)$ MIB bits of the $B_{max}$ bit codeword associated to $\hat{v}(n)$ equal to $L_s(n-1)-(B-2)$ MIB bits associated to $\hat{v}(n-1)$. In this case, the (B−2) bits are fed back to update the previous feedback, which is beneficial if channels are highly correlated during the time interval n−1 and the time interval n. These additional bits are obtained by going up by B−2 levels into the quantization tree. This is performed by feeding back bits at positions $L_s(n-1)-(B-2)+1, \ldots, L_s(n-1)$ of the codeword associated to $\hat{v}(n)$. Moreover, according to Table 2, additional 2-bit of [1 0] will be attached as signaling.

3. Up case II: This case occurs when $L_s(n-1)-(B-2)$ MIB bits associated to $\hat{v}(n)$ doesn't equal to $L_s(n-1)-(B-2)$ MIB bits associated to $\hat{v}(n-1)$. In this case, the (B−2) bits will be used to replace the previous feedback. These additional bits are obtained by going down to B−2 levels into the quantization tree. This is performed by feeding back bits at positions $1, \ldots, (B-2)$ of the codeword associated to $\hat{v}(n)$. Moreover, according to Table 2, additional 2-bit of [1 1] will be attached as singling.

Further, the first bit in the feedback equals to 1, i.e., in the case of performing up search to the binary tree, using the second bit to represent two causes: one case corresponding to update the previous feedback with bits of B−2, i.e., the case of feeding back the bit at the position $L_s(n-1)-(B-2)+1, \ldots, L_s(n-1)$ of the codeword associated with $\hat{v}(n)$, and the other case corresponding to replacing the previous feedback with B−2 bits, i.e., the case of feeding back the bit at the position $1, \ldots, (B-2)$ of the codeword associated with $\hat{v}(n)$.

As previously mentioned, the first and second bits of the feedback bits are used for how to search signaling representations of best codewords on a binary tree of a hierarchical codebook. In the case of high correlation between a previous time slot and a succeeding time slot, the two signaling bits may be used to represent the matching relationship between the bit sequences of the preceding and succeeding time slots. For example, with a 6-level binary tree and feeding back 3 bits each time interval as an example. Starting from the current fourth-level codeword 0001, all codewords of the upper one or several levels and the rear codeword of the lower level codeword 0001 are all candidate codewords for the next time interval. If 0000 is the best codeword, it is represented using feedback 100, wherein the first bit represents upward search on the binary tree, the second bit represents that the fed bit is for updating the codeword of the preceding time interval, and the third bit is for replacing the codeword of the preceding time; if 000110 is the best codeword, it is represented by the feedback 010, wherein the first bit represents performing downward search on a binary three, and the second and third bits 10 represent chosen codewords in the candidate codewords in the subsequent level.

Figure 3:
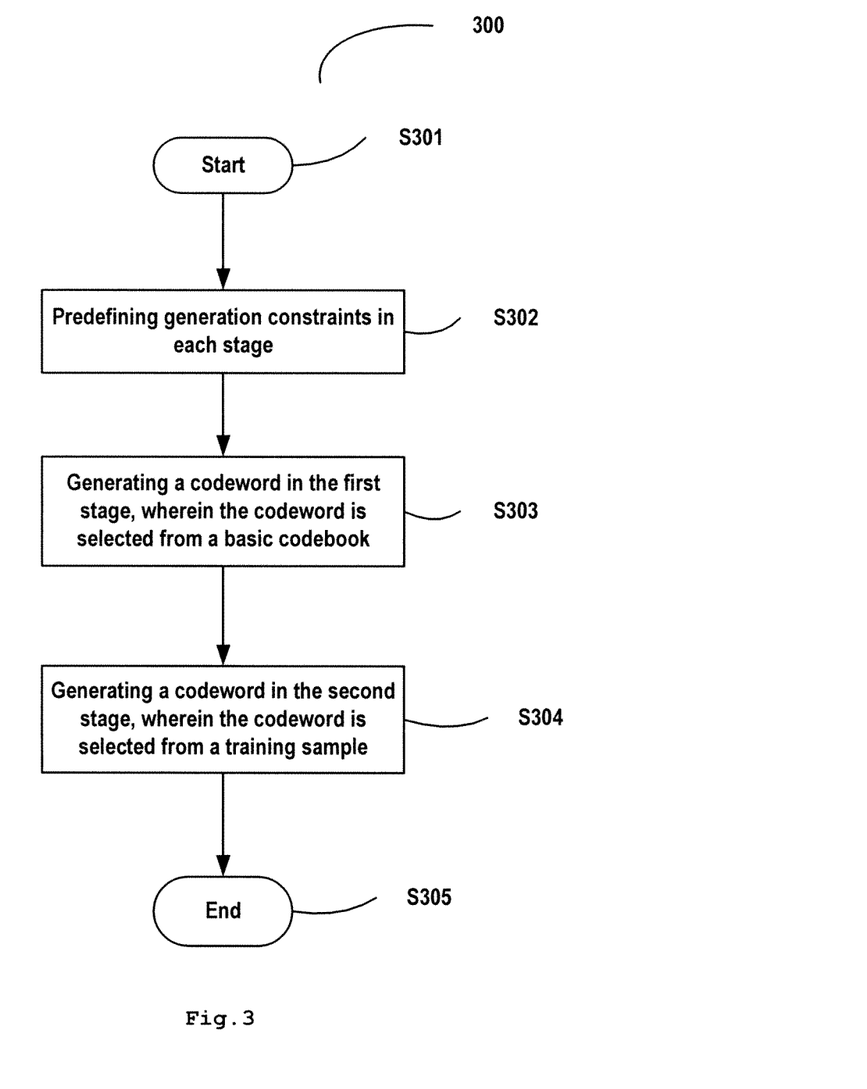
FIG. 3 illustrates a flowchart of a staged hierarchical codebook generating method according to the present invention.

FIG. 3 shows a flowchart of a staged hierarchical codebook generation method according to the present invention. In step 301, the generation process starts.

In step S302, the codeword is divided into multiple stages, and a codebook generation restraint is predefined for each stage. For example, for the first stage, the generation constraint that has to be satisfied is to inherit good codebook properties and backward compatibility of a basic codebook. Preferably, the basic codebook is an LTE R8 codebook.

In step S303, the codebook codeword of the first stage is generated. As above mentioned, suppose the number of transmit antennas is 4 and the maximum number of feedback bits is 12, the first stage has to generate the first to fourth levels of codebook codewords, wherein the best codeword of each level is selected from a basic codebook LTE R8 4Tx codebook $\{u_k\}$, so as to guarantee backward compatibility of the LTE R8 codebook.

In step S304, a codebook codeword of the second stage is generated. As above mentioned, the remaining 5-12 levels are generated, wherein the best codeword at each level is selected based on a predetermined matrix of all training samples.

As an example, in steps S303 and S304, the codewords for each level are selected from a basic codebook or a training sample based on a specific performance metric. Preferably, the specific performance metric comprises, but not limited to, capacity maximization, minimum even square error, minimum distance, maximum signal-to-interference ratio, maximum signal-to-interference-plus-noise ratio, and maximum signal-to-interference ratio, etc.

As another example, in steps S303 and S304, the LBG algorithm may be employed to select codewords for each level from a basic codebook or training samples.

In step S305, the codebook generation is completed.

Figure 4:
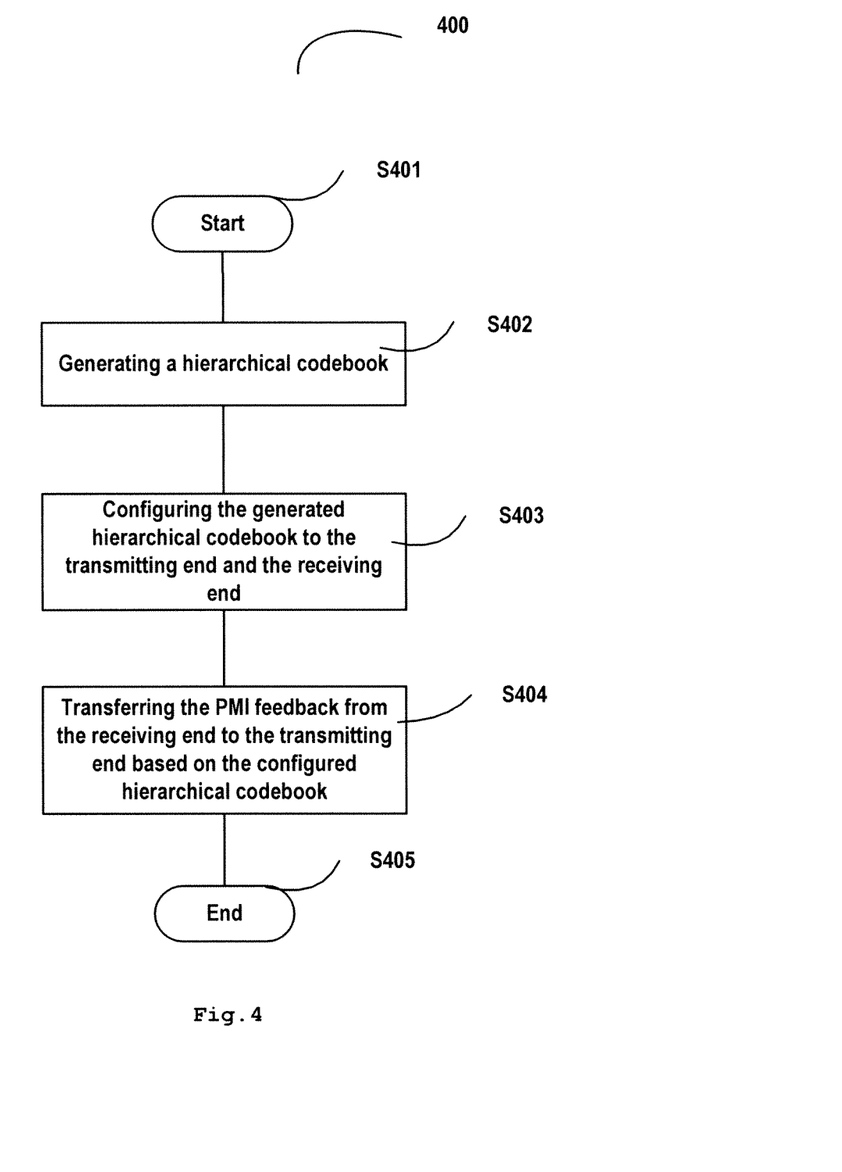
FIG. 4 illustrates a flowchart of a method for channel state information feedback according to the present invention.

Now, with reference to FIG. 4, it shows a flowchart of a channel state information feedback method 400 according to the present invention.

In step S401, the channel state information feedback process starts.

In step S402, LTE R10 hierarchical codebook compatible with the LTE R8 is generated based on the staged hierarchical codebook generation method as illustrated in FIG. 3. As above mentioned, the hierarchical codebook inherits good codebook properties and can provide an optimized system performance gain.

In step S403, the generated LTE R10 hierarchical codebook is configured to the transmit end for example a base station and a receive end for example a user terminal.

As above mentioned, limited uplink bandwidth merely allows returning a small amount of feedback bits each time interval. Typically, the feedback bits are for indexing a group of vectors (i.e., codewords) in a codebook (known to the transmitter and all receivers). For example, B bits may be used to index a codebook having 2B vectors. For a transmitter having M antennas, each codework in the codebook is a M-dimension vector, which may describe an MIMO channel. a good codebook will include a combination of codewords effectively covering the experienced channels, while a beamforming function is just derived from these vectors, for example, as a certain kind of linear combination of these vectors. Codebook generation is generated offline for a great amount of channel environments of various kinds. By configuring an offline generated codebook to the base station and the user terminal, the base station and user terminal may index a same codebook with limited feedback bits and share the channel status information. Various kinds of codebook sharing methods known in the art may be used to configure the generated codebook to the base station and user terminal, thereby implementing initial configuration of a hierarchical codebook.

In step S404, feedback bits for indexing a particular codeword in the codebook are transferred from a receiving end (e.g., user terminal) to a transmitting end (e.g., base station) based on the configured codebook according to the above feedback signaling mechanism. As mentioned above, limited uplink bandwidth merely allows returning a small amount of feedback bits each time interval. Typically, the feedback bits are for indexing a group of vectors (i.e., codewords) in a codebook (known to the transmitter and all receivers). For example, B bits may be used to index a codebook having 2B vectors. For a transmitter having M antennas, each codework in the codebook is a M-dimension vector, which may describe an MIMO channel, a good codebook will include a combination of codewords effectively covering the experienced channels, while a beamforming function is just derived from these vectors, for example, as a certain kind of linear combination of these vectors. When the user terminal feeds back the PMI data corresponding to the current channel status to the base station, the base station can utilize the data for subsequent precoding and downlink data transmission. The specific implementation of step 403 may be performed based on the aforementioned improved PMI feedback signaling mechanism according to the present invention.

In step S405, the channel status information feedback process ends.

Figure 5:
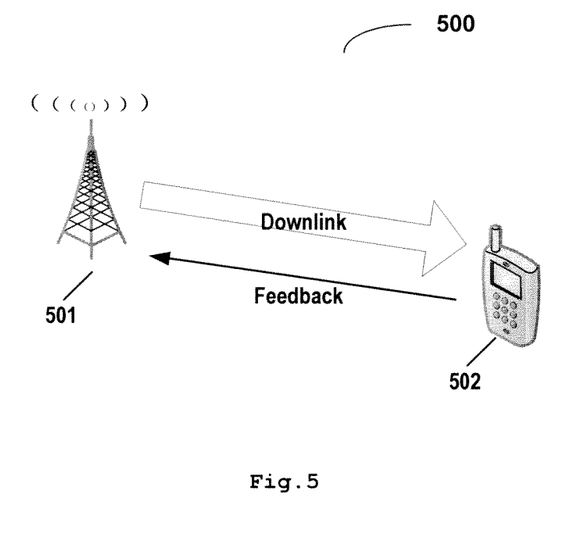
FIG. 5 illustrates a diagram of an MIMO communication system that may implement the method for channel state information feedback according to the present invention.

FIG. 5 shows a schematic diagram of an MIMO communications system that may implement the channel status feedback method of the present invention. The communications system 500 comprises a plurality of base stations 501 and a plurality of user terminals 502. For the sake of simplicity, the figure merely illustrates one base station and one user terminal. In the context of the present invention, both the base station 501 and the user terminal 502 may be used for generating a hierarchical codebook and deliver the generated codebook to the communicating counterparts. After both the transmitter and the receiver hold a same codebook simultaneously, the user terminal 502 transmits PMI data to the base station 501 using the feedback over the uplink, i.e., indexing a particular word in the codebook. After the base station 501 receives the relevant channel status information, it performs channel reestablishment based on the feedback.

The hierarchical codebook is improved through the novel but effective method of the present invention. Through staged codebook generation with different codebook generation constrains per stage, the resulted hierarchical codebook can achieve good tradeoff between good codebook properties and performances. Such codebook properties are often important to reduce UE/eNB PMI/CQI calculation complexity, robust interference measurements, effective usage of power amplifier, rank adaptation, etc. Also, LTE R8 codebook is a mandatory feature in LTE R10, and the staged hierarchical codebook according to the present invention provides good backward compatibility so that the resulted hierarchical feedback based thereupon is more easy and realistic to be supported in LTE R10.

The channel status information feedback method according to the present invention has the following advantages:

1. having good codebook properties like constant modulo, finite alphabet, unitary, nested structure, etc., in the first stage of the hierarchical codebook.

2. The first stage generation ensures backward compatibility with LTE R8 codebook. This means that LTE R8 codebook is the baseline for R10 codebook generation, and the method according to the present invention provides a flexible but effective backward compatibility for the hierarchical feedback.

3. Improved signaling mechanism to improve feedback approaches in some cases (for example, high correlation between a previous timeslot and a succeeding timeslot).

Improving feedback accuracy for DL MU-MIMO (downlink multi-user terminal multi-in multi-out) is one of the most important feature in 3GPP LTE-A. The hierarchical feedback method is a preferred candidate for this topic. Considering the effectiveness of the method in this invention, it is very suitable to be used in the future LTE-A wireless systems.

It should be noted that in the description of the present invention with reference to the drawings, the illustration takes a downlink scenario from a base station to a user terminal as an example.

It should be understood that various embodiments of the present invention may also server an uplink scenario from the user terminal to the base station. In other words, the present invention may be applied to any scenario of feeding back channel information from the receiving end to the transmitting end, wherein the transmitting end may be a base station, a relay station, and a user terminal; and the receiving terminal may be a base station a relay station, and a user terminal.

Through reading this disclosure, those skilled in the art would appreciate the channel state information feedback solution comprising an improved staged hierarchical codebook generation method and an associated PMI feedback method. Although preferred embodiments and applications of the present invention are illustrated and described here, it should be understood that the present invention is not limited to the accuracy steps and functions as disclosed here, and to those skilled in the art, various modifications, alternations, and changes to the method steps and functional modules of the present invention as disclosed here are obvious without departing from the essence and scope of the invention defined by the appended claims.

What is claimed is:

1. A method of performing channel status information feedback in a communication system, comprising:
    generating a hierarchical codebook;
    dividing each level of codeword in a to-be-generated codebook into a plurality of segments based on a basic codebook;
    generating each level of codeword in a first stage, wherein the each level of codeword in the first stage is selected from the basic codebook;
    generating each level of codeword in other stages, wherein the each level of codeword in the other stages is selected from a pre-provided training sample matrix;
    configuring the generated hierarchical codebook to a transmitting end and a receiving end, respectively; and
    feeding back the channel status information from the receiving end to the transmitting end based on the hierarchical codebook.

2. The method according to claim 1, further comprising:
    for each divided stage, predefining codebook generation constraints suitable for the corresponding divided stage.

3. The method according to claim 2, wherein the codebook generation constraints for the first stage comprise compatibility to the basic codebook or inheriting good codebook properties,
    wherein the codebook generation constraints for other stages comprise optimizing system performances.

4. The method according to claim 1, wherein a codeword for each level is selected from the basic codebook or from the corresponding pre-provided training sample matrix based on a particular performance metric.

5. The method according to claim 4, wherein the particular performance metric includes at least one of the following items: capacity maximization, minimum even square error, minimum distance, maximum signal-to-noise ratio, maximum signal-to-interference plus noise ratio, and maximum signal-to-interference ratio.

6. The method according to claim 1, wherein the feeding back comprises:
using a first bit and a second bit of feedback bits to represent a signaling for performing tree search to the hierarchical codebook.

7. The method according to claim 6, wherein feeding back further comprises:
comparing a binary word of a vector of a current feedback time interval n with a binary word of a vector of the preceding time interval n−1; and
determining one or more feedback bit to use based on the comparison result.

8. A communication system of performing channel status information feedback, comprising:
a generating processor configured to generate a hierarchical codebook;
a dividing processor configured to divide each level of codeword in a to-be-generated codebook into a plurality of segments based on a basic codebook;
a first stage processor configured to generate each level of codeword in a first stage, wherein the each level of codeword in the first stage is selected from the basic codebook;
an other stage processor configured to generate each level of codeword in other stages, wherein the each level of codeword in the other stages is selected from a pre-provided training sample matrix;
a configuring processor configured to configure the generated hierarchical codebook to a transmitting end and a receiving end, respectively; and
a feedback processor configured to feed back the channel status information from the receiving end to the transmitting end based on the hierarchical codebook.

9. The communication system according to claim 8, further comprising a constraint processor, for each divided stage, configured to predefine codebook generation constraints suitable for the corresponding divided stage.

10. The communication system according to claim 9, wherein the codebook generation constraints for the first stage comprise compatibility to the basic codebook or inheriting good codebook properties,
wherein the codebook generation constraints for other stages comprise optimizing system performances.

11. The communication system according to claim 8, wherein the first stage processor and the other stage processor are configured to select a codeword for each level from the basic codebook or from the corresponding pre-provided training sample matrix based on a particular performance metric,
wherein the particular performance metric includes at least one of the following terms: capacity maximization, minimum even square error, minimum distance, maximum signal-to-noise ratio, maximum signal-to-interference plus noise ratio, and maximum signal-to-interference ratio.

12. The communication system according to claim 8, wherein the feedback processor comprises:
a search processor configured to use a first bit and a second bit of feedback bits to represent a signaling for performing tree search to the hierarchical codebook.

13. The communication system according to claim 12, wherein the feedback processor comprises:
a comparing processor configured to compare a binary word of a vector of a current feedback time interval n with a binary word of a vector of the preceding time interval n−1; and
a determining processor configured to determine one or more feedback bit to use based on the comparison result.

14. A method of performing channel status information feedback in a communication system, comprising:
generating a hierarchical codebook;
configuring the generated hierarchical codebook to a transmitting end and a receiving end, respectively;
feeding back the channel status information from the receiving end to the transmitting end based on the hierarchical codebook; and
using a first bit and a second bit of feedback bits to represent a signaling for performing tree search to the hierarchical codebook.

15. The method according to claim 14, wherein the generating comprises:
dividing each level of codeword in a to-be-generated codebook into a plurality of segments based on a basic codebook;
generating each level of codeword in a first stage, wherein the each level of codeword in the first stage is selected from the basic codebook; and
generating each level of codeword in other stages, wherein the each level of codeword in the other stages is selected from a pre-provided training sample matrix.

16. The method according to claim 15, further comprising:
for each divided stage, predefining codebook generation constraints suitable for the corresponding divided stage.

17. The method according to claim 16, wherein the codebook generation constraints for the first stage comprise compatibility to the basic codebook or inheriting good codebook properties,
wherein the codebook generation constraints for other stages comprise optimizing system performances.

18. The method according to claim 15, wherein a codeword for each level is selected from the basic codebook or from the corresponding pre-provided training sample matrix based on a particular performance metric.

19. The method according to claim 18, wherein the particular performance metric includes at least one of the following items: capacity maximization, minimum even square error, minimum distance, maximum signal-to-noise ratio, maximum signal-to-interference plus noise ratio, and maximum signal-to-interference ratio.

20. The method according to claim 14, wherein the feeding back further comprises:
comparing a binary word of a vector of a current feedback time interval n with a binary word of a vector of the preceding time interval n−1, and
determining one or more feedback bit to use based on the comparison result.

* * * * *